Patented July 27, 1948

2,446,107

UNITED STATES PATENT OFFICE 2,446,107

CREAMING OF SYNTHETIC RUBBER LATICES

John S. Rumbold, Woodbridge, Conn., assignor to United States Rubber Company, New York, N. Y., a corporation of New Jersey No Drawing. Application December 30, 1944, Serial No. 570,768

5 Claims. (Cl. 260—29.7)

This invention relates to improvements in creaming of synthetic rubber latices.

Synthetic rubber latices, as is known, may be prepared by the emulsion polymerization in an aqueous medium by butadiene-1,3 hydrocarbons or mixtures of butadiene-1,3 hydrocarbons with other polymerizable compounds capable of forming copolymers with butadiene-1,3 hydrocarbons. Such aqueous emulsion polymerizates, or synthetic rubber latices, may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means, such as decantation, drawing-off, and the like.

By the present invention, there is obtained an increase in the concentration of synthetic rubber in the polymer-rich or cream fraction in the creaming of synthetic rubber latices with hydrophilic colloidal creaming agents.

In carrying out the present invention there is incorporated in the synthetic rubber latices in addition to the hydrophilic colloidal creaming agent a strong alkali from the group consisting of alkali metal hydroxides and quaternary ammonium hydroxides. The minimum amount of strong alkali that will appreciably improve the creaming with a hydrophilic colloidal creaming agent is .4% by weight based on the water phase of the latex. It is definitely undesirable in practice to have a synthetic rubber latex with over 3% strong alkali by weight based on the water phase and this amount is considered the upper limit that can be added to improve the creaming operations. It is stated in the article "Manufacture and processing of Buna type synthetic rubbers" by Hans J. Mueller, in India Rubber World, vol. 107, pp. 34-35 (October 1942) that Buna type synthetic rubber latices may be creamed with conventional hydrophilic colloidal creaming agents and also with alkalies alone. 3% strong alkali based on the water phase of the latex does not of itself cream synthetic rubber latex in the absence of the hydrophilic colloidal creaming agent, and hence we have a truly synergistic effect of an insufficient amount of strong alkali to itself cream the latex increasing considerably the concentration of solids in the polymer-rich or cream portion resulting from creaming with a conventional hydrophilic colloidal creaming agent.

The hydrophilic colloidal creaming agents that will cause a separation of the dispersion into polymer-rich and polymer-poor fractions may be those well known for the creaming of latex, for example, vegetable mucilages, such as alginates, pectates, extracts of the endosperms of leguminous plants belonging to the genera Cassia, Ceratonia, Caesalpinia and Poinciana, mucilages obtained from plants of the genera Astragalus and Acacia, from the seaweed *Chondrus crispus*, and from the stem of the cactus *Opuntia monocantha*, extracts of leaves of *Hibiscus rosasinensis* and of the pods of *Hibiscus esculentus*, extracts of Crocus and Amaryllis bulbs, and of the tubers of *Amorphophallus variabilis* and *rivieri*, and extracts of the seeds of *Tamarindus indica*, and the like. Hydrophilic colloidal creaming agents of synthetic origin may also be used, such as polyacrylates, and cellulose derivatives, such as alkylated celluloses and the so-called hemi-celluloses. The amount of hydrophilic colloidal creaming agent is generally between .03 and 1 part of the creaming agent by weight based on the water phase of the latex.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadiene-1,3 hydrocarbons, for example, butadiene-1,3, methyl-2-butadiene-1,3 (isoprene), piperylene, 2,3-dimethylbutadiene-1,3. The polymerizable material as known may be a mixture of such butadiene-1,3 hydrocarbons with other polymerizable compounds which are capable of forming rubbery copolymers with butadiene-1,3 hydrocarbons, for example, up to 70% of such mixture of compounds which contains a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene. Present day commercial synthetic rubbers of the above types are copolymers of butadiene-1,3 and styrene, known as Buna S or GRS rubber and copolymers of butadiene-1,3 and acrylonitrile, known as Buna N or GRN rubber.

The following examples are illustrative of the invention:

Example I

Portions of an aqueous dispersion of a copolymer of 60 parts by weight of butadiene-1,3 to 40 parts by weight of acrylonitrile (sold under the trade name "Hycar OR Latex") were mixed with the required amounts of a 3% solution of ammonium alginate to give alginate concentrations from .16 to .24% based on the water content of the dispersion. The solids content of each portion was adjusted to 28%. The pH was found to be 8.2. The percent weight of the original latex in each case which separated as the serum or copolymer-poor lower layer after standing for six days, and the concentration of copolymer solids in the cream or upper copolymer-rich layer, are shown in the following table:

| Per Cent Alginate Based on Water Phase | Per Cent Separation of Lower Layer after 6 Days | Per Cent Solids Concentration of Copolymer in Upper Layer after 6 Days |
| --- | --- | --- |
| .16 | 26.3 | 35.8 |
| .18 | 28.0 | 36.5 |
| .20 | 29.5 | 37.6 |
| .22 | 30.6 | 38.1 |
| .24 | 30.6 | 38.4 |

The pH of the same "Hycar OR Latex" was raised to 12 by the addition of 2% of potassium hydroxide based on the water content of the latex. To various portions of the thus treated latex were added various amounts of alginate and the dispersion samples were allowed to stand for six days. The percentage of the latex in each case which separated as the co-polymer-poor lower layer, and the concentration of copolymer solids in the upper copolymer-rich layer, are shown in the following table:

| Per Cent Alginate Based on Water Phase | Per Cent Separation of Lower Layer after 6 Days | Per Cent Solids Concentration of Copolymer in Upper Layer after 6 Days |
| --- | --- | --- |
| .30 | 50.9 | 53.4 |
| .325 | 50.8 | 54.1 |
| .35 | 51.6 | 54.3 |
| .375 | 53.3 | 55.4 |
| .40 | 50.6 | 53.2 |
| .45 | 48.0 | 52.7 |

The concentration of the cream solids was thus increased from something less than 40% to over 50% by the addition of strong alkaline material, together with the creaming agent. It will be noted that the alginate concentration used is higher at the higher pH. This is because larger amounts of creaming agents are needed at the higher pH to obtain optimum creaming conditions, as illustrated more particularly in Example II.

Example II

A Buna S latex was made by polymerizing an aqueous emulsion of 75 parts by weight of butadiene-1,3 to 25 parts of styrene containing 4% (based on the total polymerizable material) of cyclohexanol and 4% (based on the total polymerizable material) of the sodium salts of the sulphuric acid esters of the alcohols obtained from the coconut oil as an emulsifying agent. The latex had a solids content of 29.7%. Samples to which various amounts of ammonium alginate were added and the latex solids adjusted to 28%, gave creaming results after five days as shown in the following table:

| Per Cent Alginate Based on Water Phase | Per Cent Separation of Lower Layer after 5 Days | Per Cent Solids Concentration of Copolymer in Upper Layer after 5 Days |
| --- | --- | --- |
| .15 | 32.2 | 42.9 |
| .20 | 36.9 | 46.5 |
| .25 | 31.8 | 42.3 |
| .30 | 8.0 | 31.3 |

Different amounts of potassium hydroxide were added to portions of the same latex together with alginate and the concentration in each case was adjusted to 28% solids. Creaming results after five days standing are as shown in the table below:

| Percent Potassium Hydroxide based on Water Phase | Percent Alginate Based on Water Phase | Percent Separation of Lower Layer after 5 Days | Percent Solids Concentration of Copolymer in Upper Layer after 5 Days |
| --- | --- | --- | --- |
| None | .27 | 39.4 | 44.5 |
| .5 | .26 | 43.8 | 48.2 |
| 1.0 | .26 | 46.4 | 50.8 |
| 1.5 | .26 | 55.7 | 60.5 |

It is clear from the above tables that the presence of small amounts of a strong alkali has a considerable effect on the concentration of the cream. By increasing the alginate content in the presence of the fixed alkali and allowing the latex to stand for ten days, a further increase of copolymer concentration of the cream was obtained, as shown below:

| Percent Potassium Hydroxide Based on Water Phase | Percent Alginate Based on Water Phase | Percent Solids Concentration of Copolymer in Upper Layer after 10 Days |
| --- | --- | --- |
| 1.35 | .300 | 65.5 |
| 1.34 | .325 | 64.4 |

This illustrates the increase in creaming agent in the presence of the strong alkali to obtain optimum creaming.

Example III

A Buna S latex was made by polymerizing an aqueous emulsion of 75 parts by weight of butadiene-1,3 to 25 parts of styrene containing 5% potassium abietate based on the weight of the polymerizable material as an emulsifying agent. The latex had a solids content of 29%. 5 kgs. of the Buna S latex were mixed with .47 kg. of a 3% solution of potassium alginate and samples were treated with various amounts of 25% solutions of potassium hydroxide and trimethylbenzyl ammonium hydroxide. All samples were made equal in weight by addition of the requisite amount of water. After standing six days, the subnatant copolymer-poor portions were drawn off and the residual copolymer-rich creams were analyzed for total solids with results as shown in the following table:

| Per Cent Potassium Hydroxide Based on Water Phase | Per Cent Trimethyl-benzyl-Ammonium Hydroxide Based on Water Phase | Per Cent Total Solids of the Latex | Per Cent Separation of Lower Layer after 6 Days | Per Cent Solids Concentration of Copolymer in Upper Layer after 6 Days |
|---|---|---|---|---|
| None | | 24.7 | 1.8 | 25.2 |
| .5 | | 25.1 | 51.5 | 49.9 |
| 1.0 | | 25.5 | 55.4 | 54.2 |
| 1.5 | | 25.8 | 56.0 | 55.2 |
| 2.0 | | 26.2 | 57.2 | 56.7 |
| 2.5 | | 26.6 | 58.4 | 59.0 |
| 3.0 | | 26.9 | 59.0 | 60.9 |
| | .5 | 25.1 | 47.5 | 45.8 |
| | 1.0 | 25.5 | 51.8 | 50.4 |
| | 1.5 | 25.8 | 53.7 | 52.4 |
| | 2.0 | 26.2 | 54.3 | 53.1 |
| | 2.5 | 26.6 | 55.2 | 54.1 |
| | 3.0 | 26.9 | 55.5 | 54.7 |

The above examples include amounts of strong alkali up to 3% based on the water phase of the synthetic rubber latex. The 3% of strong alkali in the above examples was insufficient of itself to cream the synthetic rubber latex or have any partial creaming in the absence of the hydrophilic colloidal creaming agent. The truly synergistic effect of the strong alkali on the creaming properties of the hydrophilic colloidal creaming agent is clearly illustrated in the following example where the same latex to which various amounts of potassium hydroxide alone were added without any creaming effect, showed the improvement where the latex was creamed by the addition of hydrophilic colloidal creaming agent.

Example IV

A Buna S latex of 36.9% total solids content was made by polymerizing an aqueous emulsion of equal parts by weight of butadiene-1,3 and styrene containing 5% potassium abietate based on the weight of polymerizable material as an emulsifying agent. To samples of the latex were added various amounts of a 25% solution of potassium hydroxide and one sample to which no potassium hydroxide was added was run as a control. All samples were made equal in weight by addition of the requisite amount of water. After standing two days no serum had separated in any of the samples.

At the end of two days an amount of 1½% solution of ammonium alginate was added to each sample to give the dry alginate content of .2% based on the water of the latex. After standing one day more the subnatant copolymer-poor portions were drawn off and the residual copolymer-rich creams were analyzed for total solids with results shown in the following table:

| Percent Potassium Hydroxide Based on Water Phase | Percent Total Solids of Latex | Percent Separation of Lower Layer after One Day | Percent Solids Concentration of Copolymer in Upper Layer after One Day |
|---|---|---|---|
| None | 30.7 | 37.7 | 47.5 |
| 0.5 | 31.0 | 38.8 | 48.8 |
| 1.0 | 31.3 | 40.8 | 50.8 |
| 1.5 | 31.6 | 41.4 | 51.8 |
| 2.0 | 31.9 | 43.0 | 53.7 |
| 2.5 | 32.1 | 43.8 | 54.8 |
| 3.0 | 32.4 | 41.4 | 53.3 |

Example V

It is presumably the presence of the strong alkali and not the increased pH that is primarily responsible for the present improvement in creaming, since the latex may be buffered to prevent normal increase in pH on addition of the strong alkali and still give the improvement in creaming as illustrated below:

A Buna S latex of 40% total solids content was made by polymerizing an aqueous emulsion of equal parts by weight of butadiene-1,3 and styrene containing 5% potassium abietate and 1% "Daxad" based on the weight of polymerizable material as emulsifying and stabilizing agents. ("Daxad" is a commercial stabilizer which is the sodium salt of the condensation product of naphthalene sulfonic acid and formaldehyde.) The latex was diluted to 30% solids. 0.2% ammonia based on the water phase was added and carbon dioxide was bubbled in to form ammonium bicarbonate, the final equilibrium pH being 6.8. The latex was then stabilized by adding 10% of the potassium soaps of the fatty acids of coconut oil based on the latex solids. As the soap solution was alkaline, the pH of the latex was raised to 8. 0.2% ammonium alginate based on the water phase was added. One portion was allowed to cream without addition of potassium hydroxide and to two other equal portions was added 1 and 2% potassium hydroxide based on the water phase before being allowed to cream. The three portions were made equal in weight by addition of the requisite amounts of water. After standing two days, the subnatant copolymer-poor portions were drawn off and the residual copolymer-rich creams were analyzed for total solids with results shown in the following table:

| Per Cent Potassium Hydroxide Based on Water Phase | pH of the Latex | Per Cent Total Solids of the Latex | Per Cent Separation of Lower Layer after Two Days | Per Cent Solids Concentration of Copolymer in Upper Layer after Two Days |
|---|---|---|---|---|
| None | 8.0 | 25.2 | 51.7 | 48.9 |
| 1 | 9.5 | 25.9 | 56.0 | 55.0 |
| 2 | 11.5 | 26.7 | 55.0 | 55.6 |

In view of the many changes and modifications that may be made without departing from the principles underlying the invention, reference should be made to the appended claims for an understanding of the scope of the protection afforded the invention.

This application is a continuation-in-part of my copending application Serial No. 478,006, filed March 4, 1943, now abandoned.

Having thus described my invention, what I claim and desire to protect by Letters Patent is:

1. The improvement in the creaming with a hydrophilic colloidal creaming agent of a synthetic rubber latex comprising an aqueous emulsion polymerizate of polymerizable material selected from the group consisting of butadiene-1,3 hydrocarbons and mixtures of butadiene-1,3 hydrocarbons with other polymerizable compounds which contain a $CH_2=C<$ group and are capable of forming copolymers with butadiene-1,3 hydrocarbons which comprises carrying out the creaming operation in the presence of .03 to 1 percent based on the water phase of the aqueous emulsion polymerizate of a hydrophilic colloidal creaming agent selected from the group consisting of vegetable mucilages, polyacrylates, alkylated celluloses, and hemi-celluloses, and in addition .4 to 3 percent based on the water phase of the aqueous emulsion polymerizate of strong alkali from the group consisting of alkali-metal hydroxides and quaternary ammonium hydroxides.

2. The improvement in the creaming with a hydrophilic colloidal creaming agent of a synthetic rubber latex comprising an aqueous emulsion polymerizate of polymerizable material selected from the group consisting of butadiene-1,3 hydrocarbons and mixtures of butadiene-1,3 hydrocarbons with other polymerizable compounds which contain a $CH_2=C<$ group and are capable of forming copolymers with butadiene-1,3 hydrocarbons which comprises carrying out the creaming operation in the presence of .03 to 1 percent based on the water phase of the aqueous emulsion polymerizate of a hydrophilic colloidal creaming agent selected from the group consisting of vegetable mucilages, polyacrylates, alkylated celluloses, and hemi-celluloses, and in addition .4 to 3 percent based on the water phase of the aqueous emulsion polymerizate of alkali-metal hydroxide, the amount of alkali-metal hydroxide present being insufficient of itself to cream the emulsion polymerizate in the absence of the hydrophilic colloidal creaming agent.

3. The improvement in the creaming with a hydrophilic colloidal creaming agent of a synthetic rubber latex comprising an aqueous emulsion polymerizate of a mixture of a butadiene-1,3 hydrocarbon and a compound which contains a $CH_2=C<$ group and is copolymerizable with butadiene-1,3 hydrocarbons which comprises carrying out the creaming operation in the presence of .03 to 1 percent based on the water phase of the aqueous emulsion polymerizate of a hydrophilic colloidal creaming agent selected from the group consisting of vegetable mucilages, polyacrylates, alkylated celluloses, and hemi-celluloses, and in addition .4 to 3 percent based on the water phase of the aqueous emulsion polymerizate of strong alkali from the group consisting of alkali-metal hydroxides and quaternary ammonium hydroxides.

4. The improvement in the creaming with a vegetable mucilage of a synthetic rubber latex comprising an aqueous emulsion polymerizate of a mixture of a butadiene-1,3 hydrocarbon and a compound which contains a $CH_2=C<$ group and is copolymerizable with butadiene-1,3 hydrocarbons which comprises carrying out the creaming operation in the presence of .03 to 1 percent based on the water phase of the aqueous emulsion polymerizate of a vegetable mucilage and .4 to 3 percent based on the water phase of the aqueous emulsion polymerizate of potassium hydroxide.

5. The improvement in the creaming with a vegetable mucilage of a synthetic rubber latex comprising an aqueous emulsion polymerizate of a mixture of butadiene-1,3 and styrene which comprises carrying out the creaming operation in the presence of .03 to 1 percent based on the water phase of the aqueous emulsion polymerizate of a vegetable mucilage and .4 to 3 percent of alkali-metal hydroxide based on the water phase of the aqueous emulsion polymerizate, the amount of alkali-metal hydroxide being insufficient of itself to cream the emulsion polymerizate in the absence of the vegetable mucilage.

JOHN S. RUMBOLD.

REFERENCES CITED

The following references are of record in the file of this patent:

UNITED STATES PATENTS

| Number | Name | Date |
|---|---|---|
| Re. 19,434 | McGavack | Jan. 22, 1935 |
| 1,816,018 | Loomis | July 28, 1931 |
| 1,980,599 | Sholz | Nov. 13, 1934 |
| 2,123,862 | Ten Brock | July 12, 1938 |
| 2,326,956 | Mack | Aug 17, 1943 |

FOREIGN PATENTS

| Number | Country | Date |
|---|---|---|
| 502,470 | Great Britain | Mar. 17, 1939 |
| 537,132 | Great Britain | June 10, 1941 |

OTHER REFERENCES

India Rubber World, article by Mueller, vol. 107, pp. 34–35, October, 1942.